United States Patent [19]

Donig et al.

[11] Patent Number: 5,495,241
[45] Date of Patent: Feb. 27, 1996

[54] METHOD FOR REDUCING POWER LOSS IN DEVICES FOR CONTACTLESS DATA AND ENERGY TRANSFER, AND APPARATUS FOR PERFORMING THE METHOD

[75] Inventors: Günter Donig, Ottobrunn; Bruno Scheckel, Ebersberg; Karl-Reinhard Schön, Munich, all of Germany

[73] Assignee: Siemens Aktiengesellschaft, Munich, Germany

[21] Appl. No.: 323,075

[22] Filed: Oct. 13, 1994

Related U.S. Application Data

[63] Continuation-in-part of Ser. No. 208,048, Mar. 8, 1994, abandoned, which is a continuation of Ser. No. 826,397, Jan. 27, 1992, abandoned.

[30] Foreign Application Priority Data

Jan. 25, 1991 [EP] European Pat. Off. ............ 91100993

[51] Int. Cl.⁶ .................................................. G06K 7/00
[52] U.S. Cl. ............................ 340/870.39; 340/870.31; 323/282; 323/284; 323/356
[58] Field of Search ............... 340/870.39, 870.28, 340/870.31, 825.31; 323/282–284, 355, 356

[56] References Cited

U.S. PATENT DOCUMENTS 4,697,183  9/1987  Jenning et al. .
4,924,171  5/1990  Baba et al. .

FOREIGN PATENT DOCUMENTS 0309201  3/1989  European Pat. Off. .
0466949  1/1992  European Pat. Off. .
87/06375  10/1987  WIPO .
88/03684  5/1988  WIPO .

*Primary Examiner*—Michael Horabik
*Attorney, Agent, or Firm*—Herbert L. Lerner; Laurence A. Greenberg

[57] ABSTRACT

In a method and apparatus for reducing power loss in devices for contactless data and energy transfer, a function unit is provided in a movable part which ascertains the value of the current loss of a voltage regulator. This value is then either stored in memory or compared with a command value. A stationary part can read out this value or receive a signal if the command value is exceeded, which indicates to it that the energy supply must be reduced.

12 Claims, 4 Drawing Sheets

METHOD FOR REDUCING POWER LOSS IN DEVICES FOR CONTACTLESS DATA AND ENERGY TRANSFER, AND APPARATUS FOR PERFORMING THE METHOD

CROSS-REFERENCE TO RELATED APPLICATION

This application is a Continuation-In-Part of application Ser. No. 08/208,048, filed Mar. 8, 1994, now abandoned; which was a continuation of Ser. No. 07/826,397, filed Jan. 27, 1992, now abandoned.

BACKGROUND OF THE INVENTION

FIELD OF THE INVENTION

The invention relates to a method and apparatus for reducing the power loss in devices for contactless data and energy transfer, including a stationary part having at least one coil for data and energy transfer, and a movable part having at least one coil for data and energy transfer and a voltage regulator.

Such an apparatus is disclosed in German Patent DE 34 47 560 C2, corresponding to U.S. Pat. No. 4,697,183, and in particular in FIGS. 1 and 2 thereof and the associated text describing those figures.

Those patents show a device for contactless data and energy transfer or transmission, including a stationary part called a microstation and an oscillator for contactless power transfer with the aid of at least one pair of coils in a moveable part called a microunit. In the device described therein, two coils are provided in the stationary part, which form a total of two pairs of coils with two coils in the moveable part. Data transfer from the moveable part to the stationary part is effected by simultaneously varying the load on the two coils of the moveable part, which assures that there will be evidence of the load variation at one of the two coils of the stationary part, even if the pairs of coils were transposed. The oscillation of the oscillator in the stationary part is split into two separate oscillations (a reference oscillation and an information oscillation). Upon one oscillation (the information oscillation), a phase displacement relative to the other oscillation is imposed as a function of the data to be transferred, with the reference oscillation serving as a reference variable. The phase-displaced oscillation is supplied to the moveable part through one of the pairs of coils, and the other oscillation is supplied through the other pair of coils. The power is transferred through both pairs of coils, with the aid of both oscillations. In the moveable part, the transferred oscillations are supplied to a demodulator in the form of a phase comparator, which recovers the data from the phase displacement.

A respective rectifier is connected to the output side of each connection terminal of each coil in the moveable part. The output that furnishes the positive voltage in one of the rectifiers is interconnected with the output that furnishes the positive voltage in the other of the rectifiers, and the two output terminals of the two rectifiers, both of which furnish the negative voltage, are connected to one another as well. The common output of the two rectifier circuits is connected to a voltage regulator for furnishing the operating voltage of the moveable part. The voltage regulator may be a serial or a parallel regulator, for example.

Published European Application No. 90 113 587.1, corresponding to U.S. application Ser. No. 590,088, filed Sep. 28, 1990, shows a device for contactless data and energy transfer and is distinguished from the known device described above primarily due to the fact that the power transfer is accomplished with the aid of only one pair of coils, and that the data transfer from the moveable part to the stationary part is effected by varying the load on the coil of the moveable part, which coil is not used for the power transfer.

Briefly described this well-known arrangement relates to an arrangement for contactless data and energy transfer as shown in FIG. 2 of the aforesaid reference, whereon the stationary part ST includes an oscillator OSC and a first transistor TI forming the means for contactless energy transfer via a first core L1a, and wherein an exclusive OR-gate EXOR together with a second transistor T2 and an evaluation circuit AS form means for data transfer from the stationary to the movable part via a second core L2a. The means for data transfer further include a data input DT1 and a data output DR1 which may be connected with process control means, such as for example a microprocessor.

The movable part BT shows two cores L2a and L2b, which together with cores L1a and L1b of the stationary part form the two pairs of coils. Both cores L2a and L2b of the movable part are similarly connected to a rectifier circuit GRa and GRb. The two rectifier circuits are respectively connected to a modulator "Moda", "Modb" and a voltage regulator SRA and SRB. Furthermore, the outputs of cores L2a and L2b are connected with a demodulator "Demod". The demodulator, the voltage regulator and the modulators are connected with a logic circuit, e.g. a microprocessor. The rectifier circuits, the modulators, the demodulator and the logic circuit form a function unit which is connected with the voltage controllers.

In order to assure that the coils of the stationary part can be arbitrarily associated with the coils of the moveable part to form pairs of coils, and thus to assure that energy or data can be transferred through each of the two coils, even if not simultaneously, not only a rectifier circuit but also at least the final control element of a voltage regulator along with at least one switch, which can vary the load on the pair of coils associated with it as a function of its triggering and of the switch position effected by its triggering, are associated with each of the two coils of the moveable part. It is also possible for a voltage regulator and a variable load to be assigned to each coil, or for only one voltage regulator and one variable load, which can be selectively connected to the output side by reversing the coils of the moveable part, to be provided. In all such cases, a logical linkage must assure that the amplitude modulator required for data transfer from the moveable part to the stationary part always varies the load of the pair of coils which does not participate in the energy transfer, and which has a voltage regulator or voltage regulator final control element which is consequently not activated, or which does not have the voltage regulator connected to its output side.

If the coils of the moveable part and the coils of the stationary part can be coupled arbitrarily and a demodulator circuit as described above having a circuit for fixing the logic level of the signal is therefore provided, then in the same way in which it defines the logic level, the circuit unit can also recognize at which of the coils of the moveable part the information oscillation, which is variable in its phase position relative to the reference oscillation, is transferred. In such a device for contactless data and energy transfer, a logical linkage acts as a function of a demodulator circuit containing the information to define which coil of the moveable part is used for the data transfer from the moveable part to the stationary part, and which coil is intended for the energy transfer. It is also assured that the data transfer from the moveable part to the stationary part is performed with the aid of whichever coil of the moveable part is not being used for energy transfer at that moment. In order to assure a continuous energy supply to the moveable part, the coil that transfers the reference oscillation has a voltage regulator connected to its output side, or a voltage regulator connected to the output side of that coil is activated. For the data transfer from the moveable part to the stationary part, the load is varied as a function of the data to be transferred, at the coil of the moveable part that transfers the information oscillation.

One of the main problems of the above-described devices for contactless data and energy transfer is the manufacturing tolerances of the various components, and the resultant varying operating conditions in different systems. Such pronounced tolerances affect the data of the coil pairs (such as the coupling factor) above all, but they also affect the supply of energy to the primary side and the energy systems on the secondary side as well. Such tolerances have to be compensated for by supplying additional energy to the primary side. The excess energy is converted into heat on the secondary side in a so-called shunt controller. The usually poor heat conduction coefficients of the moveable parts (such as a chip card or key) cause impermissibly severe heating of those parts, which can destroy the component contained in the moveable part in the worst case.

SUMMARY OF THE INVENTION

It is accordingly an object of the invention to provide a method for reducing power loss in devices for contactless data and energy transfer and an apparatus for performing the method, which overcome the hereinafore-mentioned disadvantages of the heretofore-known methods and devices of this general type and which reduce the excess energy in the moveable part to a minimum.

With the foregoing and other objects in view there is provided, in accordance with the invention, a method for reducing power loss in devices for contactless data and energy transfer, including a stationary part having at least one coil for data and energy transfer, and a movable part having at least one coil for data and energy transfer and having a voltage regulator, which comprises transferring a defined energy with the stationary part from the stationary part to the movable part; ascertaining a leakage current in the voltage regulator with the movable part, transferring an ascertained value of the leakage current from the movable part to the stationary part upon request by the stationary part or permanently, and then regulating an energy supply to the movable part in the stationary part as a function of the ascertained value.

In accordance with another mode of the invention, there is provided a method for reducing the power loss in devices for contactless data and energy transfer, which comprises forming a digital value corresponding to the leakage current, and storing the digital value in memory in a memory unit of the movable part; and reading out the stored value in the movable part and reducing the energy supply in accordance with the ascertained value, with the stationary part.

In accordance with a further mode of the invention, there is provided a method for reducing the power loss in devices for contactless data and energy transfer, which comprises comparing the value of the leakage current of the voltage regulator with a command value, and transferring a signal to the stationary part if the command value is exceeded; and reducing the energy supply with the stationary part until the movable part no longer sends any signal.

In accordance with an added mode of the invention, there is provided a method for reducing the power loss in devices for contactless data and energy transfer, which comprises digitizing the value of the leakage current and comparing the digitized value with a digital command value.

With the objects of the invention in view, there is also provided an apparatus for reducing power loss in devices for contactless data and energy transfer, comprising a stationary part having means for contactless data transfer, means for contactless energy transfer, and a process control connected to the means for contactless data transfer and to the means for contactless energy transfer; and a movable part having means for receiving transferred energy and for receiving and transferring data including a voltage regulator for supplying a value of a leakage current, an analog/digital converter connected to the voltage regulator for digitizing the value of the leakage current, a memory, and means connected between the analog/digital converter and the memory for storing the value of the leakage current in the memory; the process control controlling the means for contactless energy transfer for regulating energy supply to the movable part.

With the objects of the invention in view, there is additionally provided an apparatus for reducing power loss in devices for contactless data and energy transfer, comprising a stationary part having means for contactless data transfer, means for contactless energy transfer, and a process control connected to the means for contactless data transfer and to the means for contactless energy transfer; and a movable part having means for receiving transferred energy and for receiving and transferring data including a voltage regulator for supplying a value of a leakage current, an analog/digital converter connected to the voltage regulator for digitizing the value of the leakage current, a comparator connected to the analog/digital converter for comparing the value of the leakage current with a command value, and means connected to the comparator for generating a signal to be transferred to the stationary part if the command value is exceeded; the process control controlling the means for contactless energy transfer for regulating energy supply to the movable part.

With the objects of the invention in view, there is furthermore provided an apparatus for reducing power loss in devices for contactless data and energy transfer, comprising a stationary part having means for contactless data transfer, means for contactless energy transfer, and a process control connected to the means for contactless data transfer and to the means for contactless energy transfer; and a movable part having means for receiving transferred energy and for receiving and transferring data including a voltage regulator for supplying a value of a leakage current, a comparator connected to the voltage regulator for comparing an analog value of the leakage current with a defined command value, and means connected to the comparator for generating a signal to be transferred to the stationary part if the command value is exceeded; the process control controlling the means for contactless energy transfer for regulating energy supply to the movable part.

In accordance with a concomitant feature of the invention, the voltage regulator includes a shunt regulator having a control terminal, operating voltage terminals, and a shunt MOSFET connected between the operating voltage terminals; and a current mirror for ascertaining the leakage current value, the current mirror having an output terminal, a resistor, and first, second and third MOSFETs with gate terminals and load paths, the gate terminal of the first MOSFET being connected to the control terminal, the load paths of the first and second MOSFETs being connected between the operating voltage terminals in a first series circuit having a first center pickup, the first center pickup being connected to the gate terminals of the second and third MOSFETs, the resistor being connected with the load path of the third MOSFET between the operating voltage terminals in a second series circuit having a second center pickup, the second series circuit being connected to the output terminal for supplying a voltage proportional to the leakage current.

In contactless data and energy transfer, the method of the invention makes it simple to adapt the energy transfer to the transfer conditions that pertain. This is attained due to the fact that the movable part ascertains the value of the leakage current in the voltage regulator and stores it, for instance in digitized fashion, in a memory. This value can then be read out by the stationary part, and in accordance with the ascertained value of the leakage current, the stationary part can then regulate the supply of energy.

Another advantage of this reduction of the power loss is that the process can be repeated arbitrarily often during system operation. In this way, fluctuating operating conditions such as temperature influences can be stabilized.

Another option for reducing the power loss is for the movable part to compare the value of the loss current in the voltage regulator with a given command or desired value, and to send a signal to the stationary part if this command value is exceeded. The stationary part thereupon reduces the energy supply until such time as the value of the leakage current in the movable part attains the command values and the movable part no longer sends any signal. The command value can be ascertained digitally, for example. The ascertained value can then be compared with a defined command value by means of a comparator. Naturally, comparison of analog variables by means of an analog comparator is also possible.

Other features which are considered as characteristic for the invention are set forth in the appended claims.

Although the invention is illustrated and described herein as embodied in a method for reducing power loss in devices for contactless data and energy transfer and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
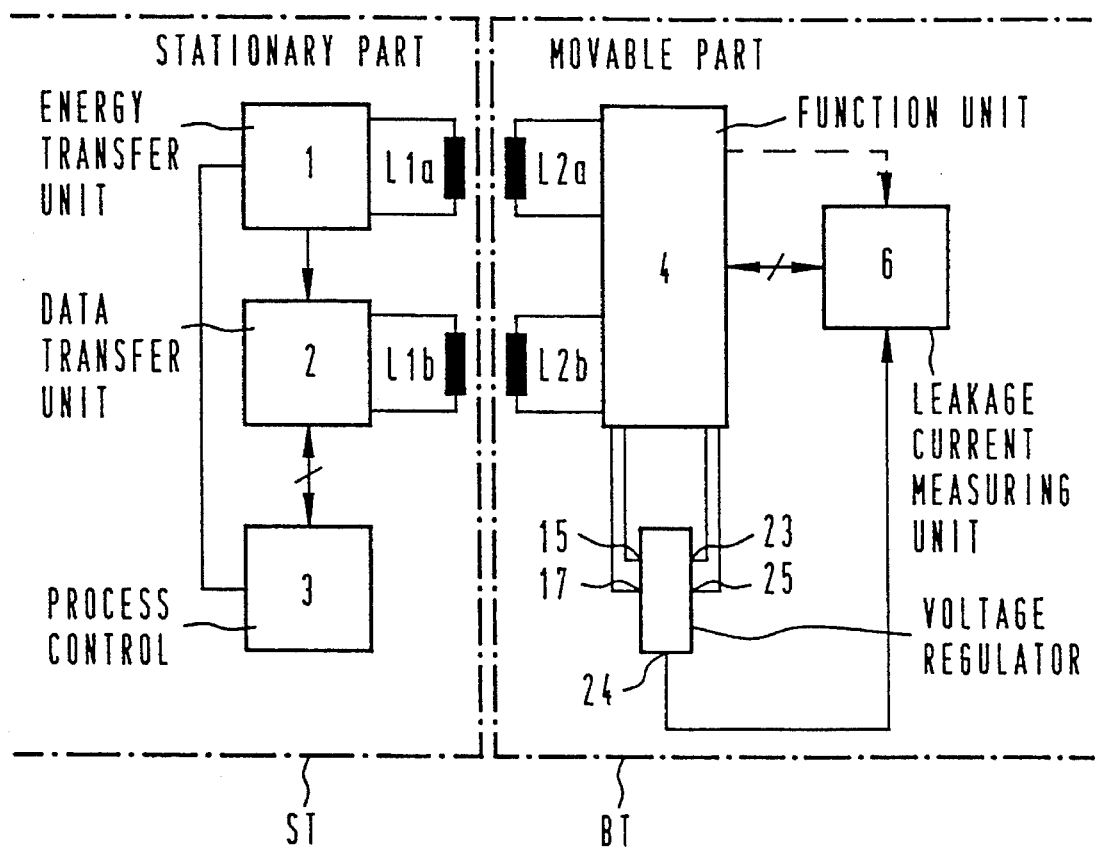
FIG. 1 is a basic schematic and block circuit diagram of an apparatus according to the invention.

Referring now to the figures of the drawing in detail and first, particularly, to FIG. 1 thereof, there is seen a basic circuit diagram of an embodiment of an apparatus according to the invention for reducing the power loss in devices for contactless data and energy transfer or transmission, which includes a stationary part ST and a movable part BT. The stationary part has two transfer coils L1a and L1b, and the movable part likewise has two transfer coils L2a and L2b. The transfer coils of the stationary part are permanently associated with the transfer coils of the movable part, to form pairs of coils. In the drawing, the stationary part ST includes a first unit 1 for energy transfer, which is connected to the first coil L1a. The energy transfer unit 1 can be constructed in accordance with, for example, FIG. 2 of EP 04 66 949 A1, and having an oscillator which drives the base of a first transistor and forms a voltage source. In that case the collector of the first transistor connected with one end of a coil L1a, having its other end connected with a voltage source. The emitter of the transistor is connected with the other pole of the voltage source. The unit 1 is adjustable, so that the energy generation is variable. This can be done by varying the voltage of the voltage source or by varying the amplitude of the oscillator. A second unit 2, which is connected to the second coil L1b, enables data transfer to the movable part BT. The second unit 2, i.e. data transfer unit 2 is formed for example as an exclusive OR-gate (EXOR-gate) as shown in EPO 0 466 949 A1, FIG. 2, which on one hand operates to transfer data, and is on the other hand driven by an additional signal from the oscillator of the energy transfer unit 1, wherein the further signal is in quadruture to the first signal of the energy transfer unit 1. The output of the EXOR-gate is connected with the base of a second transistor, which has its collector connected to one end of the coil L1b. The other end of coil L1b is connected with an additional voltage source, of which its other pole is connected with the emitter of the second transistor. The data transfer unit 2 is in addition provided with an evaluation circuit, which is capable of detecting amplitude variations of the signal of the coil L1b caused by load changes in the movable part BT. In this manner data are transferred from the movable part BT to the stationary part ST. This second unit 2 is connected to a first control unit 3. The first control unit 3 is also connected through a control line to the unit 1. This first control unit can, in response to a signal from the movable part BT to the stationary part ST, change the amount of energy transmitted from the stationary part ST to the movable part BT, depending on the loss current of the voltage regulator in the movable part BT. The first control unit 3 can be realized especially as a microprocessor. The object at the first control unit 3 resides in using a value equivalent to either a directly analog or a digital magnitude of the loss-current, after performing a decoding of either the magnitude of the voltage of the voltage source, or the amplitude of the oscillations of the oscillator of the energy transfer unit 1.

For the sake of simplicity, only one function unit 4, which is connected to the transfer coils L2a and L2b, is shown. This function unit 4 includes units that are necessary for data transfer and energy generation. In particular the function unit 4 contains rectifier circuits, which can, for example, also be seen in FIG. 2 of EP 0 466 949 A1. The coils L2a and L2b are respectively connected behind the rectifier circuits of the movable part BT. The outputs of the rectifier circuits are each connected with a respective modulator and voltage regulator. Since, after each of the coils of the movable part BT have been aligned with the coils of the stationary part ST, only one of the modulators and only one of the voltage regulators 5 assigned to the respective rectifiers, are activated as described in EP 0 466 949 A1. Therefore only one voltage regulator 5 is shown in FIG. 1. The function unit 4 further contains a demodulator which is directly connected with the two coils L2a and L2b of the movable part BT. A further component of the function unit 4 is a logic unit, which is advantageously realized as a microprocessor, which one hand processes the data coming from the stationary part, and generate, on the other hand further data that are transmitted by means of the modulators to the stationary part ST. The logic unit, however, also drives the control unit 9, or 12, in the leakage current measuring unit 6, which provides, as required, a reference voltage REF for the comparator 11, according to one possible embodiment of the leakage current measuring unit 6. This reference voltage can, however, also be generated from a specially provided or already existing reference voltage source. A further output of the voltage regulator 5 supplies a value of leakage current to a unit 6. The unit 6 sends a signal based on the value of the leakage current through the unit 4 to the stationary part ST. The loss-current of the voltage regulator 5 is a measure for the energy transferred from the stationary part ST to the movable part BT. Since a constant voltage must be present at the output of the voltage regulator 5, the loss current increases with an increasing amount of the transferred energy. This increase in the loss current is detected by the leakage current measuring unit 6, and transmitted to the stationary part ST by means of the provided modulators, wherein they are detected as data by the evaluation circuit in the data transfer unit 2, and passed on to the first control unit 3. The first control unit 3 then acts on energy transfer from the stationary part ST to the movable part BT, so that the loss current does not exceed a given value, as determined, for example, by a predetermined reference value. The energy transfer is controlled in this manner. In other words, in order to attain maximum efficiency in energy transfer, the stationary part supplies the movable part with a defined energy at which reliable reading and writing of data for every transfer condition dictated by manufacturing tolerances is assured. The voltage regulator 5, which is present in the movable part, receives an unregulated operating voltage from the function unit 4 and stabilizes it to the operating voltage needed by the movable part. The resultant leakage current is then measured by the unit 6. This unit 6 then sends a signal through the function unit 4 to the stationary part ST which the stationary part evaluates for controlling the energy supply. The transfer of the signal may, for instance, be a data word, and it can be sent either permanently or upon request of the stationary part.

Figure 2:
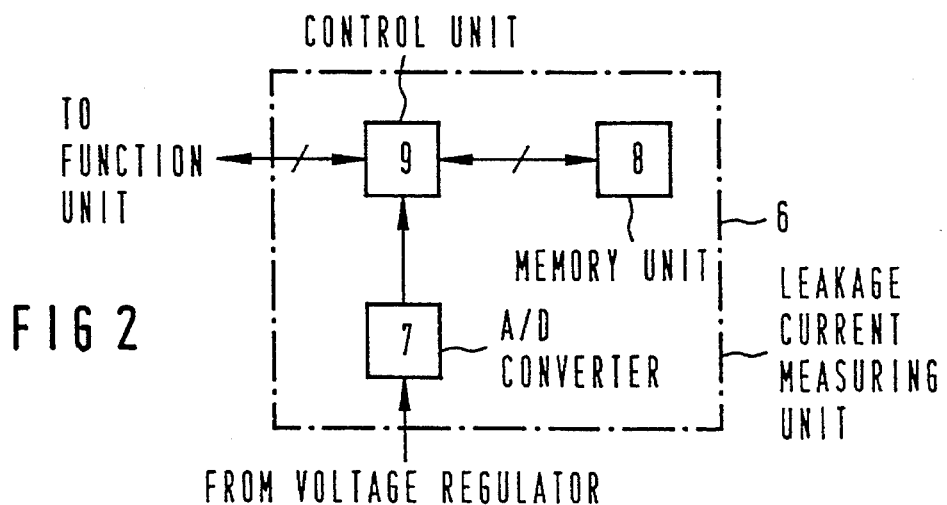
FIG. 2 is a block circuit diagram of a first embodiment of a device for ascertaining leakage current in a movable part.

FIG. 2 shows a first embodiment of the unit 6 of the movable part. In this case, the unit 6 includes a second control unit 9, which is connected to a memory unit 8 and an analog/digital converter 7. In regard to the second control unit 9, this unit is an economical control unit for the memory in order to make possible reading and writing from and to the memory. The memory unit 8 may, for instance, be a single register or a memory cell inside a memory that may be present. The analog/digital converter 7 is supplied with the analog value of the leakage current of the voltage regulator 5. The control unit 9 then stores the value of the leakage current of the voltage regulator 5 which was digitized by the analog/digital converter, in the memory unit 8. Upon a request by the stationary part ST, this memory unit 8 can then be read out. The value is then transferred through the function unit 4 to the stationary part ST. This part can then adjust the energy supply as a function of the magnitude of the leakage current. This is done through the first control unit 3, which is connected through the control line to the adjustable energy transfer or generation unit 1.

Figure 3:
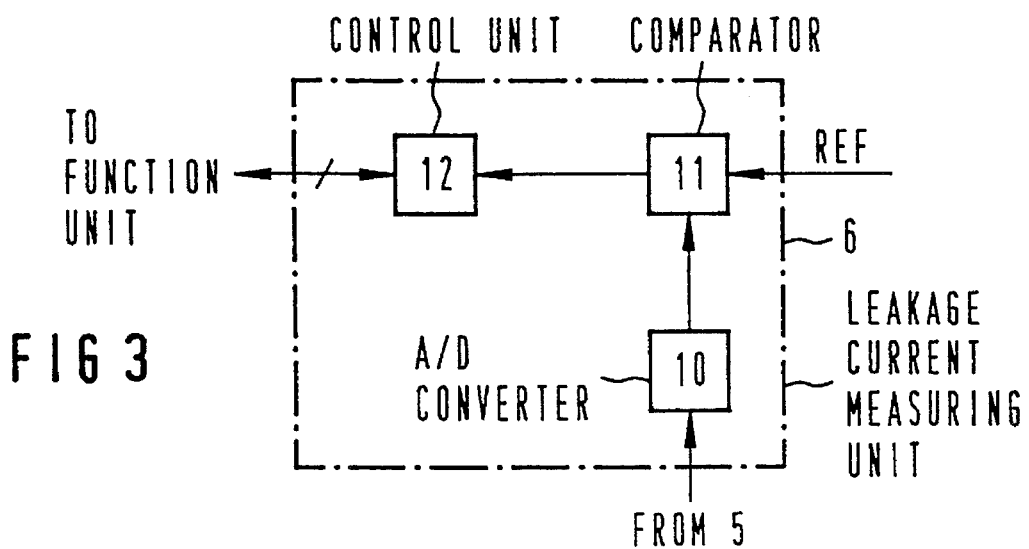
FIG. 3 is a view similar to FIG. 2 of a second embodiment a device for ascertaining the leakage current in the movable part.

Another embodiment of the unit 6 of the movable part BT is shown in FIG. 3. In this case, the unit 6 includes a third control unit 12, which is connected to an analog/digital converter 10 through a comparator 11. The third control unit 12 is a control unit readily understood by a person of ordinary skills in construction of electronic circuits designed for generating a certain signal in response to the results of a comparison performed by the comparator 11. The analog/digital converter 10 is again supplied with the value of the leakage current of the voltage regulator 5. The digitized value of the leakage current is then compared in the comparator 11 with a predetermined reference value. The result of the comparison is delivered to the unit 12. If the command or set point value is exceeded, then the control unit 12 generates a signal that is transferred to the stationary part through the function unit 4. This signal may, for instance, be a definable code word. This process is repeated continuously during the initializing phase. If the process control 3 in the stationary part recognizes this signal sent by the movable part, then it reduces the energy supply, over the control line. If the value of the leakage current of the voltage regulator 5 in the movable part is equal to the command value, the comparator 11 recognizes this fact, whereupon the control unit 12 terminates the sending of the signal to the stationary part. The stationary part then likewise terminates the stabilization of the energy supply by means of the unit 1 for energy transfer. The initializing mode is then ended, and data can be transferred bi-directionally from the movable part to the stationary part and vice versa in the normal mode.

The analog/digital converter 10 may also be omitted if an analog comparator is used instead of the digital comparator 11. However, that comparator would have to be supplied with an analog command value as a comparison value.

Figure 4:
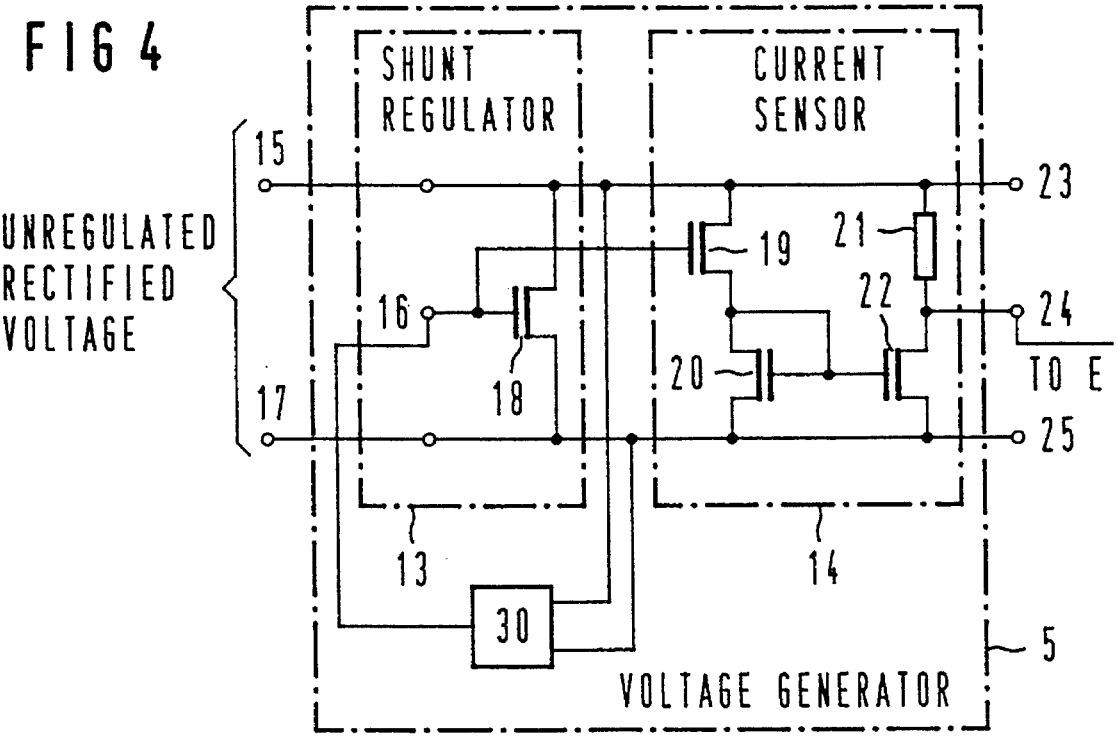
FIG. 4 is a schematic circuit diagram of an embodiment of a device for measuring the leakage current.

FIG. 4 shows an embodiment of a device for ascertaining or determining the leakage current value. Two units 13 and 14 are shown, which are located inside the voltage regulator 5. The unit 13 includes the actual regulator, which is constructed in the form of a so-called shunt regulator or parallel regulator. The unregulated, rectified operating voltage of the movable part is applied to terminals 15 and 17. The control voltage for the voltage regulator is fed in at a terminal 16. The control voltage is generated by a control circuit 30, which is also a part of the voltage regulator 5. The control circuit 30 compares the output voltage present at the output terminals of the voltage regulator 5 with a reference voltage, and generates an output voltage depending on the difference from the comparison on the terminal 16 of unit 13. The reference voltage may, in principle, as well be provided from an external source, e.g. from function unit 4, or a band-gap reference source. This terminal 16 leads to a gate terminal of a MOSFET 18, having a load path which short-circuits the operating voltage terminals 15 and 17. This kind of shunt regulator serves to pre-stabilize the operating voltage. It only needs to keep the voltage constant within a relatively wide band. A serial regulator, which then stabilizes the voltage exactly, is usually connected to the output side. However, as compared with the shunt regulator, the leakage current of the serial regulator is negligible.

The unit 14 includes so-called current sensor for ascertaining the leakage current value of the shunt regulator 13. First, second and third MOSFETs 19, 20, 22 are provided. Load paths of the first and second MOSFETs 19, 20 are connected in a first series circuit between the operating voltage terminals 15 and 17. A gate terminal of the first MOSFET 19 is connected to the gate terminal of the shunt MOSFET 18, which in turn is contained in the shunt regulator 13. A gate terminal of the second MOSFET 20 is connected to a first center pickup of the first series circuit of the load paths. The gate terminals of the second and third MOSFETs 20, 22 are also connected to one another. A resistor 21 is connected first to the operating voltage terminal 15 and second, through a load path of the third MOSFET 22 in a second series circuit, to the operating voltage terminal 17. A second center pickup between the resistor 21 and the load path of the third MOSFET 22 is connected to an output terminal 24. A voltage that is proportional to the leakage current can be picked up at this output terminal 24. Terminals 23 and 25 are connected to the operating voltage terminals 15 and 17 and carry a preregulated operating current. The circuit shown in FIG. 4 for ascertaining the leakage current value functions on the principle of a current mirror. A current $I_V/n$ that is proportional to a leakage current $I_V$ flows through the load paths of the two MOSFETs 19 and 20. This proportional current is reflected by the third MOSFET 22 and flows through the resistor 21. An output voltage $U_M = R/n \times I_V$ can thus be picked up at the output terminal 24. Reference symbol R represents the resistance of the resistor 21.

The method according to the invention can be employed with any data exchange system in which both energy and data can be transferred, and in such systems it makes it possible to ascertain the minimum necessary energy requirement of the individual movable part, in a simple fashion.

In this context, data exchange systems are systems in which a data carrier is connected to both the stationary part ST and the movable part BT of the device for contactless data and energy transfer, and in which a data processing unit is connected at least to the stationary part ST.

The movable part BT may be constructed in the form of a key. In access systems, the stationary part is then constructed in the form of a lock. In data exchange systems, the stationary part is constructed as a reading and writing device, which is possibly coupled to a data processing unit.

If the key is to be used purely as a data carrier, then the stationary part is, for instance, a writing/reading unit that is used only for data exchange. In the automotive field, the key would then store individual vehicle data in memory, for instance.

The movable part of an apparatus for reducing the energy loss in devices for contactless data and energy transfer may also be constructed in the form of a chip card or key. In that case, the stationary part is part of a reading device or of a writing and reading device.

Figure 5:
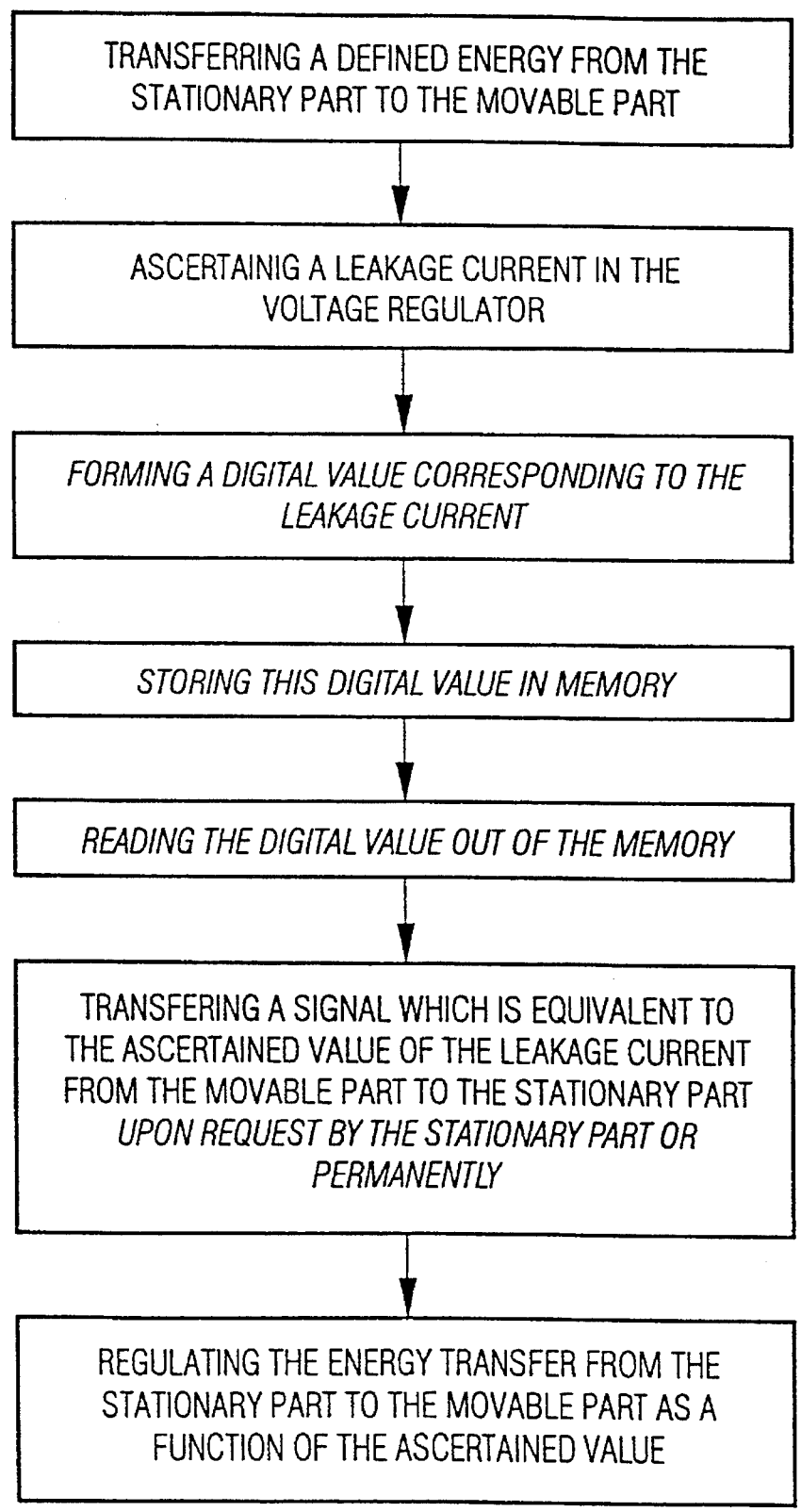
FIGS. 5 and 6 show a flow-diagram of the operation of the invention.
Figure 6:
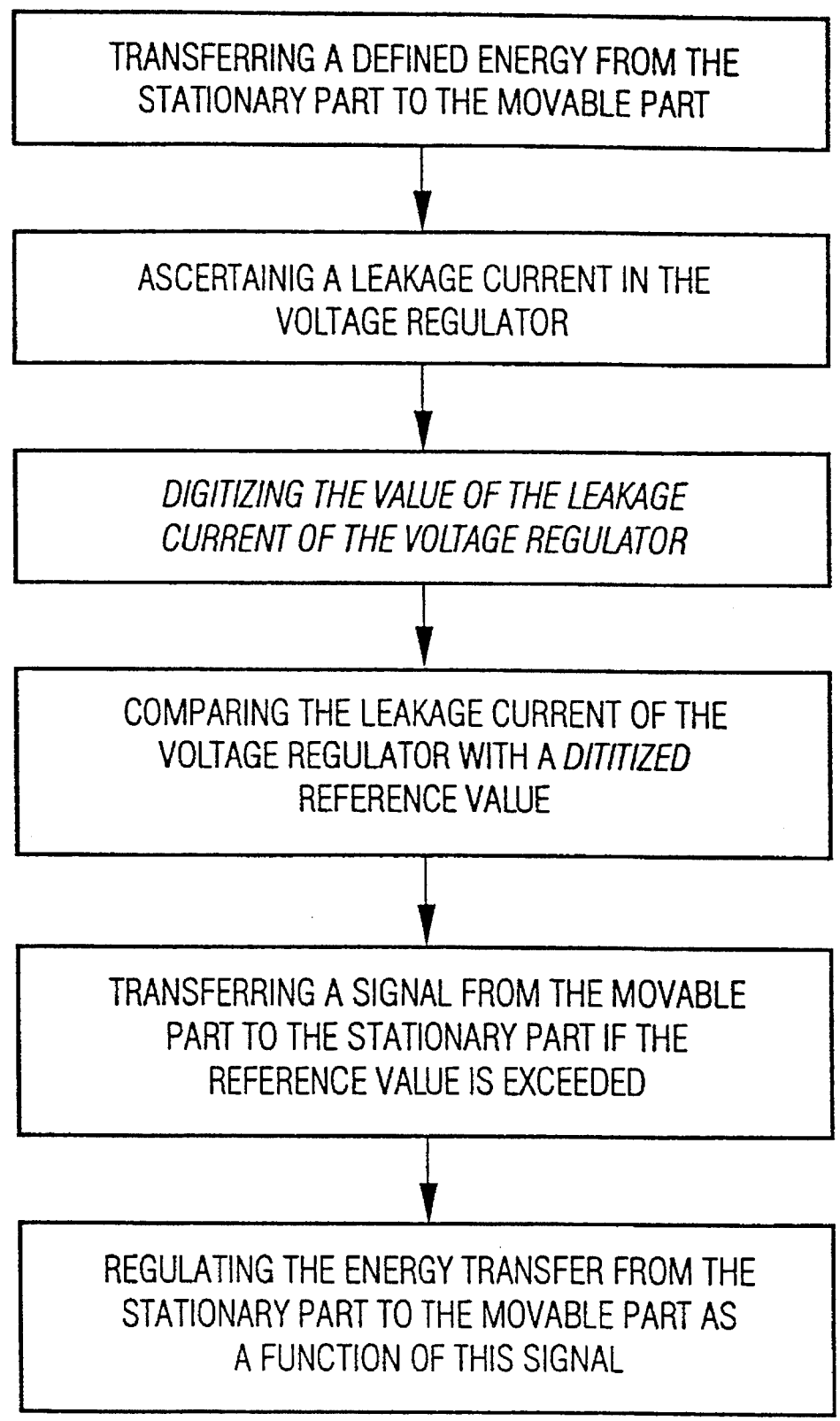

FIGS. 5 and 6 provide flow charts showing the steps of the method, and the steps recited in claim 1 are shown in heavy lines. The further steps according to the dependent claims are shown in italics instead of heavy lines.

We claim:

1. A method for reducing power loss in devices for contactless data and energy transfer, including a stationary part having at least one coil for data and energy transfer, and a movable part having at least one coil for data and energy transfer and having a voltage regulator, which comprises:

transferring a defined energy from the stationary part to the movable part;

ascertaining a leakage current in the voltage regulator;

transferring a signal which is equivalent to an ascertained value of the leakage current from the movable part to the stationary part;

regulating the energy transfer from the stationary part to the movable part as a function of the ascertained value.

2. The method for reducing the power loss in devices for contactless data and energy transfer, according to claim 1, further comprising transferring the signal from the movable part to the stationary part upon request by the stationary part.

3. The method for reducing the power loss in devices for contactless data and energy transfer, according to claim 1, further comprising transferring the signal from the movable part to the stationary part permanently.

4. The method for reducing the power loss in devices for contactless data and energy transfer, according to claim 1, further comprising forming a digital value corresponding to the ascertained leakage current, and storing the digital value in a memory of the movable part, and reading out the stored value, and transferring after read out the stored value from the movable part.

5. The method for reducing the power loss in devices for contactless data and energy transfer, according to claim 1, further comprising comparing the ascertained leakage current of the voltage regulator with a reference value, and transferring a signal from the moveable part to the stationary part if the reference value is exceeded.

6. The method for reducing the power loss in devices for contactless data and energy transfer, according to claim 5, further comprising digitizing the value of the leakage current of the voltage regulator, and comparing the digitized value with a digital reference value.

7. An apparatus for reducing power loss in devices for contactless data and energy transfer, comprising:

a first and second control unit;

a stationary part having means for performing contactless data transfer, means for performing contactless energy transfer, the first control unit connected to said means for contactless data transfer and to said means for contactless energy transfer; and a movable part having means for receiving transferred energy and means for receiving and transferring data, a voltage regulator which generates a leakage current in said movable part, an analog/digital converter connected to said voltage regulator for digitizing the value of the leakage current, a memory, and wherein the second control unit is connected between said analog/digital converter and said memory for storing the value of the leakage current in said memory; and wherein said first control unit controls said means for performing contactless energy transfer, thereby regulating energy supply to said movable part.

8. The apparatus for reducing power loss in devices for contactless data and energy transfer, according to claim 7, wherein said voltage regulator includes:

a shunt regulator having a control terminal, operating voltage terminals, and a shunt MOSFET connected between said operating voltage terminals; and a current mirror for ascertaining the leakage current value, said current mirror having an output terminal, a resistor, and first, second and third MOSFETs with gate terminals and load paths, the gate terminal of said first MOSFET being connected to said control terminal, the load paths of said first and second MOSFETs being connected between said operating voltage terminals in a first series circuit having a first center pickup node, said first center pickup node being connected to the gate terminals of said second and third MOSFETs, said resistor being connected with the load path of said third MOSFET between said operating voltage terminals in a second series circuit having a second center pickup node, said second series circuit being connected to said output terminal for supplying a voltage proportional to the leakage current.

9. An apparatus for reducing power loss in devices for contactless data and energy transfer, comprising:

a first and second control unit;

a stationary part having means for contactless data transfer, means for performing contactless energy transfer, and wherein said first control unit is connected to said means for performing contactless data transfer and to said means for performing contactless energy transfer; and a movable part having means for receiving transferred energy and means for receiving and transferring data, a voltage regulator which generates a leakage current, an analog/digital converter connected to said voltage regulator for digitizing the value of the leakage current, a comparator connected to said analog/digital converter for comparing the value of the leakage current with a reference value, and wherein said second control unit is connected to said comparator for generating a signal to be transferred to said stationary part if the reference value is exceeded by the leakage current; and wherein said first control unit controls said means for contactless energy transfer for regulating energy supply to said movable part in response to said signal.

10. The apparatus for reducing power loss in devices for contactless data and energy transfer, according to claim 9, wherein said voltage regulator includes:

a shunt regulator having a control terminal, operating voltage terminals, and a shunt MOSFET connected between said operating voltage terminals; and a current mirror for ascertaining the leakage current value, said current mirror having an output terminal, a resistor, and first, second and third MOSFETs with gate terminals and load paths, the gate terminal of said first MOSFET being connected to said control terminal, the load paths of said first and second MOSFETs being connected between said operating voltage terminals in a first series circuit having a first center pickup node, said first center pickup node being connected to the gate terminals of said second and third MOSFETs, said resistor being connected with the load path of said third MOSFET between said operating voltage terminals in a second series circuit having a second center pickup node, said second series circuit being connected to said output terminal for supplying a voltage proportional to the leakage current.

11. An apparatus for reducing power loss in devices for contactless data and energy transfer, comprising:

a stationary part having means for performing contactless data transfer, means for performing contactless energy transfer, and a first control unit connected to said means for performing contactless data transfer and to said means for performing contactless energy transfer; and a movable part having means for receiving transferred energy and means for receiving and transferring data, a voltage regulator which generates a leakage current in said movable part, a comparator connected to said voltage regulator for comparing an analog value of the leakage current with a defined reference value, and a second control unit connected to said comparator for generating a signal to be transferred to said stationary part if the reference value is exceeded; and wherein said first control unit is operative for controlling said means for performing contactless energy transfer, thereby regulating energy supply to said movable part in response to said signal.

12. The apparatus for reducing power loss in devices for contactless data and energy transfer, according to claim 11, wherein said voltage regulator includes:

a shunt regulator having a control terminal, operating voltage terminals, and a shunt MOSFET connected between said operating voltage terminals; and a current mirror for ascertaining the leakage current value, said current mirror having an output terminal, a resistor, and first, second and third MOSFETs with gate terminals and load paths, the gate terminal of said first MOSFET being connected to said control terminal, the load paths of said first and second MOSFETs being connected between said operating voltage terminals in a first series circuit having a first center pickup node, said first center pickup node being connected to the gate terminals of said second and third MOSFETs, said resistor being connected with the load path of said third MOSFET between said operating voltage terminals in a second series circuit having a second center pickup node, said second series circuit being connected to said output terminal for supplying a voltage proportional to the leakage current.

\* \* \* \* \*